US010718429B2

(12) United States Patent
Ishibashi et al.

(10) Patent No.: US 10,718,429 B2
(45) Date of Patent: Jul. 21, 2020

(54) SLIP LOCK-UP CONTROL DEVICE FOR VEHICLE

(71) Applicant: JATCO LTD, Fuji-shi, Shizuoka (JP)

(72) Inventors: Takeaki Ishibashi, Fuji (JP); Syunsuke Ogasawara, Fuji (JP); Taisuke Hikita, Fuji (JP); Tomotaka Hirano, Fuji (JP)

(73) Assignee: Jatco Ltd., Fuji-shi (JP)

( * ) Notice: Subject to any disclaimer, the term of this patent is extended or adjusted under 35 U.S.C. 154(b) by 140 days.

(21) Appl. No.: 16/082,588

(22) PCT Filed: Feb. 16, 2017

(86) PCT No.: PCT/JP2017/005694
§ 371 (c)(1),
(2) Date: Sep. 6, 2018

(87) PCT Pub. No.: WO2017/154506
PCT Pub. Date: Sep. 14, 2017

(65) Prior Publication Data
US 2019/0101210 A1 Apr. 4, 2019

(30) Foreign Application Priority Data
Mar. 9, 2016 (JP) .................................. 2016-046160

(51) Int. Cl.
*F16H 61/14* (2006.01)
*F16H 59/14* (2006.01)
*B60W 10/02* (2006.01)

(52) U.S. Cl.
CPC ........... *F16H 61/143* (2013.01); *F16H 59/14* (2013.01); *F16H 61/14* (2013.01); *B60W 10/026* (2013.01);
(Continued)

(58) Field of Classification Search
CPC ......... B60W 10/026; B60W 2710/024; B60W 2510/0657; F16H 61/14; F16H 2061/145;
(Continued)

(56) References Cited

U.S. PATENT DOCUMENTS 8,979,706 B2 * 3/2015 Tsutsui .................... F16H 61/14
477/76
2002/0082140 A1 6/2002 Suehiro et al.
(Continued)

FOREIGN PATENT DOCUMENTS

JP 2000-346189 A 12/2000
JP 2005-214283 A 8/2005
(Continued)

*Primary Examiner* — Jacob S. Scott
*Assistant Examiner* — Lillian T Nguyen
(74) *Attorney, Agent, or Firm* — Global IP Counselors, LLP

(57) ABSTRACT

A slip lock-up control device for a vehicle includes a torque converter having a lock-up clutch, and a slip lock-up controller. The slip lock-up controller performs slip lock-up control using a lock-up pressure difference command to match an actual slip rotational speed to a target slip rotational speed based on engine torque information indicative of input torque, when a lock-up engagement condition is fulfilled when the lock-up clutch is in a released state. During the slip lock-up control, when in an engine torque unstable range for which an engine torque has a rise gradient with respect to a rise change of an engine speed, the slip lock-up controller sets the lock-up pressure difference command to a second lock-up pressure difference command for which a pressure difference fluctuation is averaged more than a first lock-up pressure difference command used in a range other than the engine torque unstable range.

8 Claims, 8 Drawing Sheets

(52) U.S. Cl.
CPC .............. *B60W 2510/0657* (2013.01); *B60W 2710/024* (2013.01); *F16H 2059/147* (2013.01)

(58) Field of Classification Search
CPC ... F16H 2059/147; F16H 59/14; F16H 61/143
See application file for complete search history.

(56) References Cited

U.S. PATENT DOCUMENTS

| | | | | |
|---|---|---|---|---|
| 2009/0248266 | A1* | 10/2009 | Oue | F16H 61/143 |
| | | | | 701/68 |
| 2010/0312444 | A1* | 12/2010 | Takamatsu | F16H 61/143 |
| | | | | 701/68 |
| 2011/0264344 | A1* | 10/2011 | Yamawaki | F16H 61/143 |
| | | | | 701/68 |
| 2015/0006050 | A1 | 1/2015 | Egashira et al. | |

FOREIGN PATENT DOCUMENTS

| | | |
|---|---|---|
| JP | 2006-329261 A | 12/2006 |
| WO | 2013/105399 A1 | 7/2013 |

\* cited by examiner

SLIP LOCK-UP CONTROL DEVICE FOR VEHICLE

CROSS-REFERENCE TO RELATED APPLICATIONS

This is a U.S. national phase application of PCT/JP2017/005694, filed on Feb. 16, 2017, which claims priority to Japanese Patent Application No. 2016-046160, filed on Mar. 9, 2016. The entire disclosure of Japanese Patent Application No. 2016-046160 is hereby incorporated herein by reference.

TECHNICAL FIELD

The present invention relates to a slip lock-up control device for a vehicle for performing slip lock-up control when engaging a lock-up clutch possessed by a torque converter.

BACKGROUND ART

A slip control device of a torque converter that uses the engine torque information used with slip lock-up control as an engine torque estimated value is known from the past. This engine torque estimated value is calculated by an engine torque map value being passed through a filter when the dynamic characteristics of the engine are used as the first-order lag of a time constant $T_ED$ (see Japanese Unexamined Patent Publication No. 2010-270822, for example).

However, the engine has a range for which the engine torque or engine speed are unstable depending on the driving state. In this engine unstable range, when the engine torque is estimated by passing through a first-order lag filter having a time constant $T_{ED}$ determined based on the engine dynamics as was done conventionally, the engine torque estimated value fluctuates. Then, overlapping with the slip lock-up control executed following the fluctuating engine torque estimated value, the rotation fluctuates such that there is variation in the engine speed. Due to fluctuation of exhaust noise accompanying this engine rotation fluctuation, there is the problem that this may cause discomfort to the driver.

SUMMARY OF THE INVENTION

The present invention was created with a focus on the abovementioned problem, and its purpose is to provide a slip lock-up control device for a vehicle that suppresses fluctuation of exhaust noise that causes discomfort to the driver when in the engine torque unstable range during slip lock-up control.

To achieve the purpose noted above, the present invention comprises a torque converter having a lock-up clutch, placed between an engine and a transmission, and a slip lock-up controller.

The slip lock-up controller, when a lock-up engage condition is fulfilled when the lock-up clutch is in a released state, uses engine torque information which is input torque to perform slip lock-up control using a lock-up pressure difference command for matching the actual slip rotational speed to a target slip rotational speed.

In this slip-lock up control device for a vehicle, with the slip lock-up controller, during slip lock-up control, when in the engine torque unstable range for which an engine torque has a rise gradient with respect to a rise change of an engine speed, the lock-up pressure difference command is set to a second lock-up pressure difference command for which the pressure difference fluctuation is averaged more than the first lock-up pressure difference command when in a range other than the engine torque unstable range.

Thus, during slip lock-up control, when in the engine torque unstable range, the lock-up pressure difference command is set to the second lock-up pressure difference command for which the pressure difference fluctuation is averaged more than the first lock-up pressure difference command when in a range other than that.

Specifically, when in the engine torque unstable range, when the pressure difference fluctuation of the lock-up pressure difference command that controls the lock-up clutch engaging capacity is averaged, wavering fluctuation of the engine speed is reduced by suppression of the load fluctuation received by the engine from the lock-up clutch.

As a result, during slip lock-up control, when in the engine torque unstable range, it is possible to suppress the fluctuation of exhaust noise that causes discomfort for the driver.

MODES FOR CARRYING OUT THE INVENTION

Figure 1:
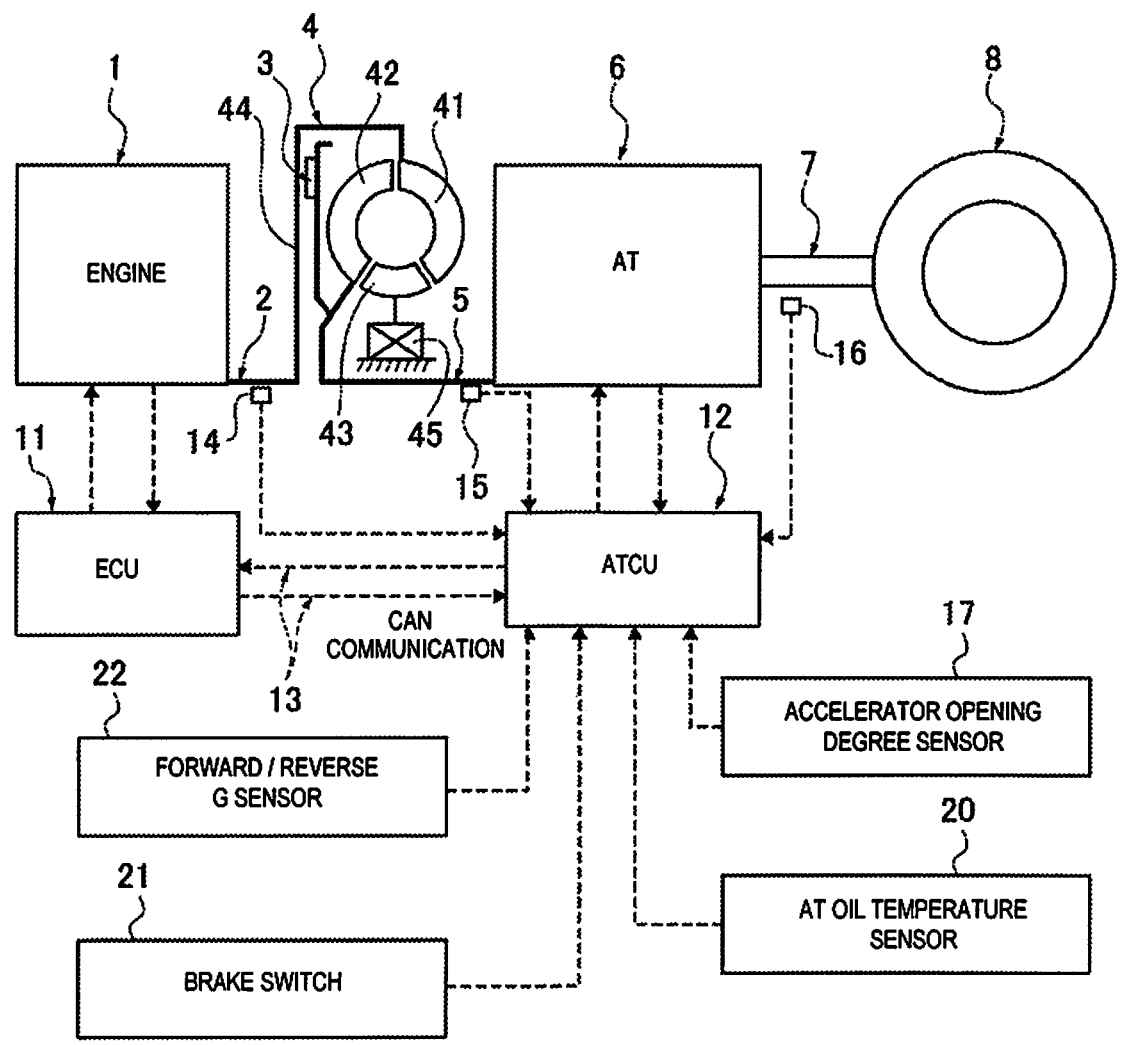
FIG. 1 is an overall system diagram showing the overall system configuration of an engine-driven vehicle to which a slip lock-up control device of embodiment 1 is applied.

Following, a best mode for carrying out the slip lock-up control device for a vehicle of the present invention is explained based on embodiment 1 shown in the drawings.

Embodiment 1

First, the configuration is explained.

A slip lock-up control device in embodiment 1 is used for an engine-driven vehicle in which a torque converter with a lock-up clutch and a stepped transmission (AT) are mounted. Hereafter, the configuration of the slip lock-up control device of an engine-driven vehicle of embodiment 1 is explained divided into an "overall system configuration, a "slip lock-up control configuration," and a "filter time constant selection process configuration."

[Overall System Configuration]

Figure 2:
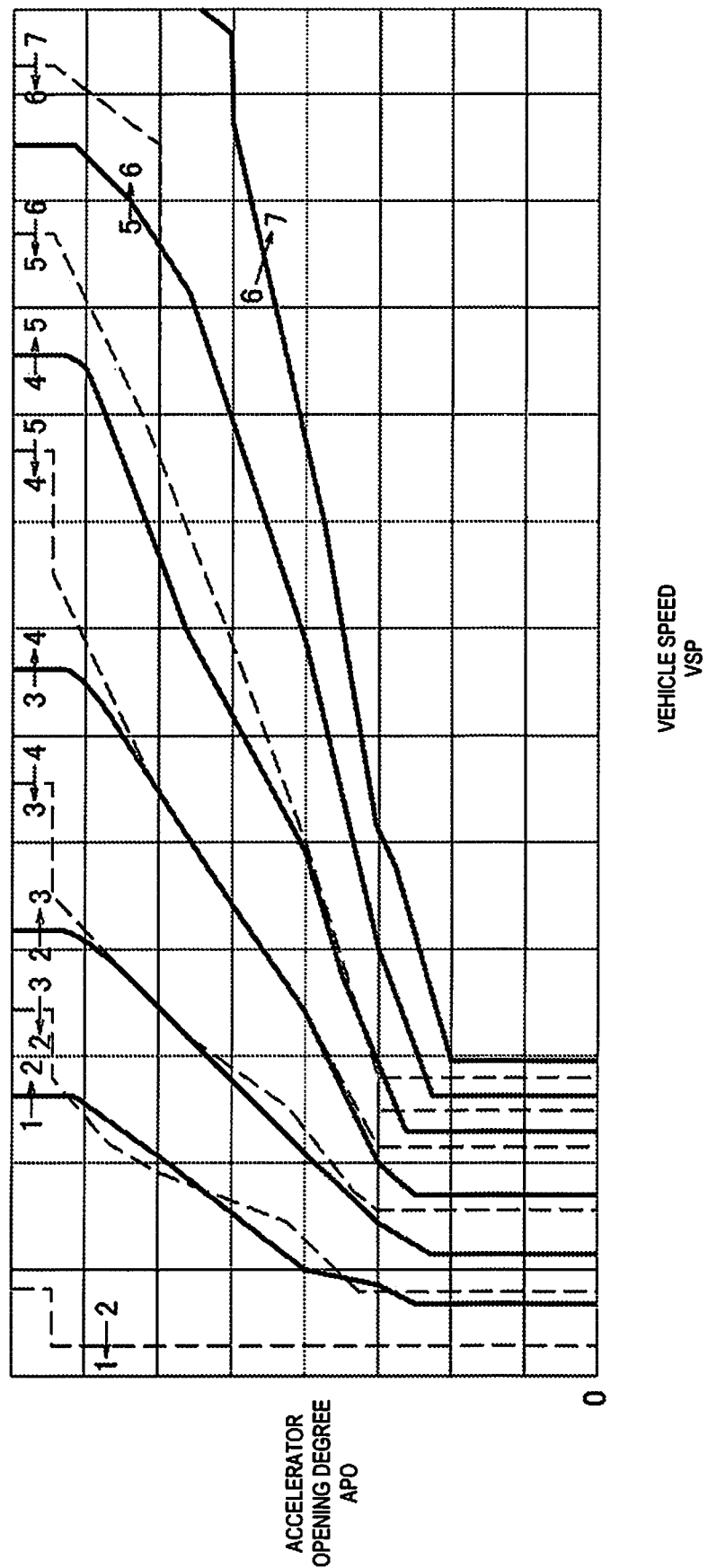
FIG. 2 is a shift schedule diagram showing an example of a shift schedule in which is drawn the up-shift line and the down-shift line that determines the shift level in a stepped transmission of seven forward levels.
Figure 3:
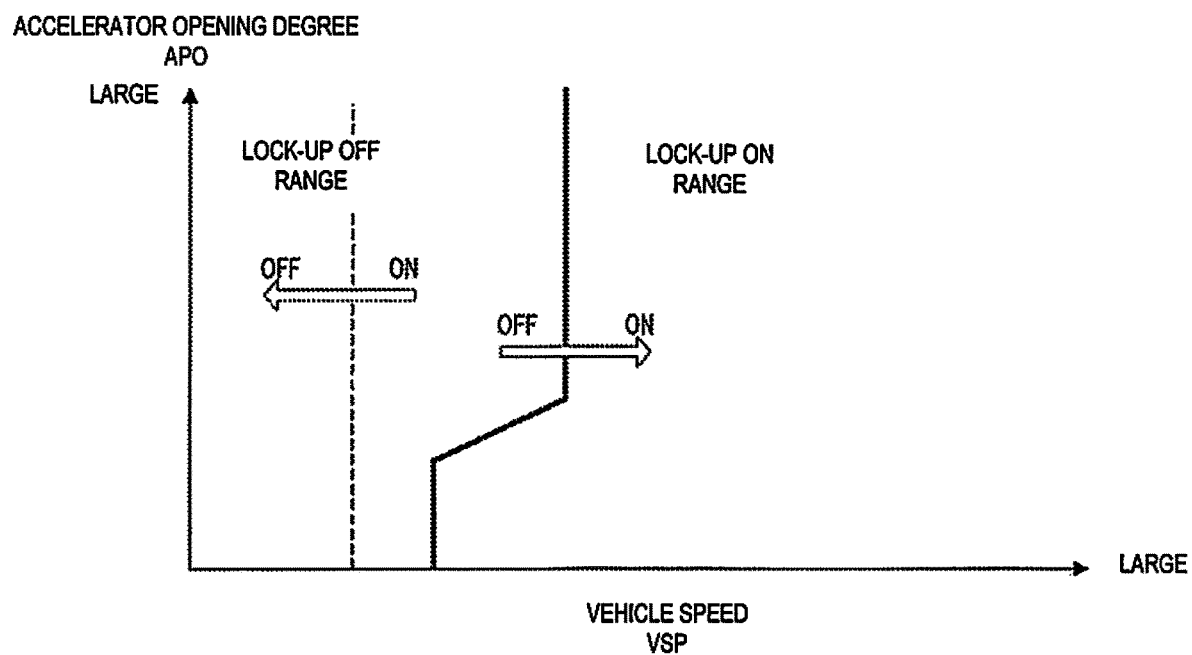
FIG. 3 is a D range LU schedule showing an example of an LU schedule in which is drawn an LU engaged vehicle speed line and an LU released vehicle speed line of the lock-up clutch during normal smooth lock-up control.

FIG. 1 shows the overall system configuration of an engine-driven vehicle to which the slip lock-up control device of embodiment 1 is applied. FIG. 2 shows a shift schedule of a stepped transmission. FIG. 3 shows a D range LU schedule. Following, the overall system configuration is explained based on FIG. 1 to FIG. 3. Note that the notation "LU" is an abbreviation for "lock-up."

As shown in FIG. 1, the vehicle drive system is provided with an engine 1, an engine output shaft 2, a lock-up clutch 3, a torque converter 4, a transmission input shaft 5, a stepped transmission 6 (transmission), a drive shaft 7, and a drive wheel 8.

The lock-up clutch 3 is built into the torque converter 4, the engine 1 and the stepped transmission 6 are connected by clutch release via the torque converter 4, and the engine output shaft 2 and the transmission input shaft 5 are directly connected by clutch engagement. With this lock-up clutch 3, when a lock-up pressure difference command (hereafter referred to as "LU pressure difference command") is outputted from an AT control unit 12 which will be described later, the engagement/slip engagement/release are controlled by a lock-up hydraulic that is pressure regulated based on line pressure that is the source pressure. The line pressure is produced by using a line pressure solenoid valve to pressure regulate discharge oil from an oil pump (not shown in the drawing) that is rotationally driven by the engine 1.

The torque converter 4 has a pump impeller 41, a turbine runner 42 placed facing opposite the pump impeller 41, and a stator 43 placed between the pump impeller 41 and the turbine runner 42. This torque converter 4 is a fluid coupling for transmitting torque by circulation of each blade of the pump impeller 41, the turbine runner 42, and the stator 42 by the hydraulic fluid filled inside. The pump impeller 41 is connected to the engine output shaft 2 via the converter cover 44, for which the inner surface is the engaging surface of the lock-up clutch 3. The turbine runner 42 is connected to the transmission input shaft 5. The stator 43 is provided on a stationary member (transmission case, etc.) via a one-way clutch 45.

The stepped transmission 6 is an automatic transmission that controls the shift ratio in stepped fashion using a combination of planetary gears, and the output rotation after shifting is transmitted to the drive wheel 8 via the drive shaft 7.

As shown in FIG. 1, a vehicle control system is provided with: an engine control unit 11 (ECU), an AT control unit 12 (ATCU), and a CAN communication line 13. As types of sensors for obtaining input information, provided are: an engine speed sensor 14, a turbine speed sensor 15 (=AT input shaft rotational speed sensor), an AT output shaft rotational speed sensor 16 (=vehicle speed sensor), and an accelerator opening degree sensor 17. Further provided are: an AT oil temperature sensor 20, a brake switch 21, and a forward/reverse G sensor 22.

The engine control unit 11 uses an engine dynamics map according to the accelerator opening degree APO and the vehicle speed VSP to perform a map search using the operating points (VSP, APO) at that time, and calculates an engine torque map value Tem. Then, the calculated engine torque map value Tem is transmitted to the AT control unit 12 via the CAN communication line 13.

The AT control unit 12 performs shift control for controlling the shift ratio of the stepped transmission 6, line pressure control, lock-up control for controlling engage/slip engage/release control of the lock-up clutch 3, etc.

As the shift control of the stepped transmission 6, shift control is implemented that changes the shift level in steps (7 forward levels, and 1 rear level, for example) using the operating points (VSP, APO), an up-shift line, and a down-shift line.

Here, as shown in the shift schedule of FIG. 2, the "up-shift line" is the shift line for outputting an up-shift command corresponding to each shift line when the operating points (VSP, APO) are crossed during travelling.

Also, as shown in the shift schedule of FIG. 2, the "down-shift line" is the shift line for outputting a down-shift command corresponding to each shift line when the operating points (VSP, APO) are crossed during travelling.

As the slip lock-up control of the lock-up clutch 3, there are "starting slip control" executed when starting, "normal smooth LU control" executed during re-acceleration, and "coasting lock-up control" executed during coasting travel with the accelerator foot released.

The "starting slip control" starts slip lock-up control of the lock-up clutch 3 based on output of clutch engaging instructions when the vehicle speed immediately after starting is reached.

With the "normal smooth LU control," as shown in the D range LU schedule in FIG. 3, control of slip engaging/release is performed according to an LU start vehicle speed line (OFF→ON) set to a higher vehicle speed range than the starting slip control, and an LU release vehicle speed line (ON→OFF) set to a vehicle speed lower than the LU start vehicle speed line. Specifically, when the operating points (VSP, APO) in the lock-up OFF range cross the LU start vehicle speed line, slip lock-up control of the lock-up clutch 3 is started based on output of the clutch engaging instruction, and the lock-up ON range is entered. Meanwhile, when the operating points (VSP, APO) in the lock-up ON range cross the LU release vehicle speed line, release control of the lock-up clutch 3 is started based on output of the clutch release instruction, and the lock-up OFF range is entered.

The "coasting lock-up control" is control that engages the lock-up clutch 3 when fuel cut control of the engine 1 is performed based on an operation of taking the foot off the accelerator during coast traveling with the foot off the accelerator. Then, in an engaged state of the lock-up clutch 3 by coasting lock-up control, when the operation of stepping on the accelerator is performed with the intention of re-accelerating, engagement of the lock-up clutch 3 is released temporarily, and after temporary LU release, the lock-up clutch 3 is engaged again. In either the case of LU engagement or the case of LU re-engagement, slip lock-up control of the lock-up clutch 3 is started based on the clutch engagement instruction.

[Slip Lock-Up Control Configuration]

Figure 4:
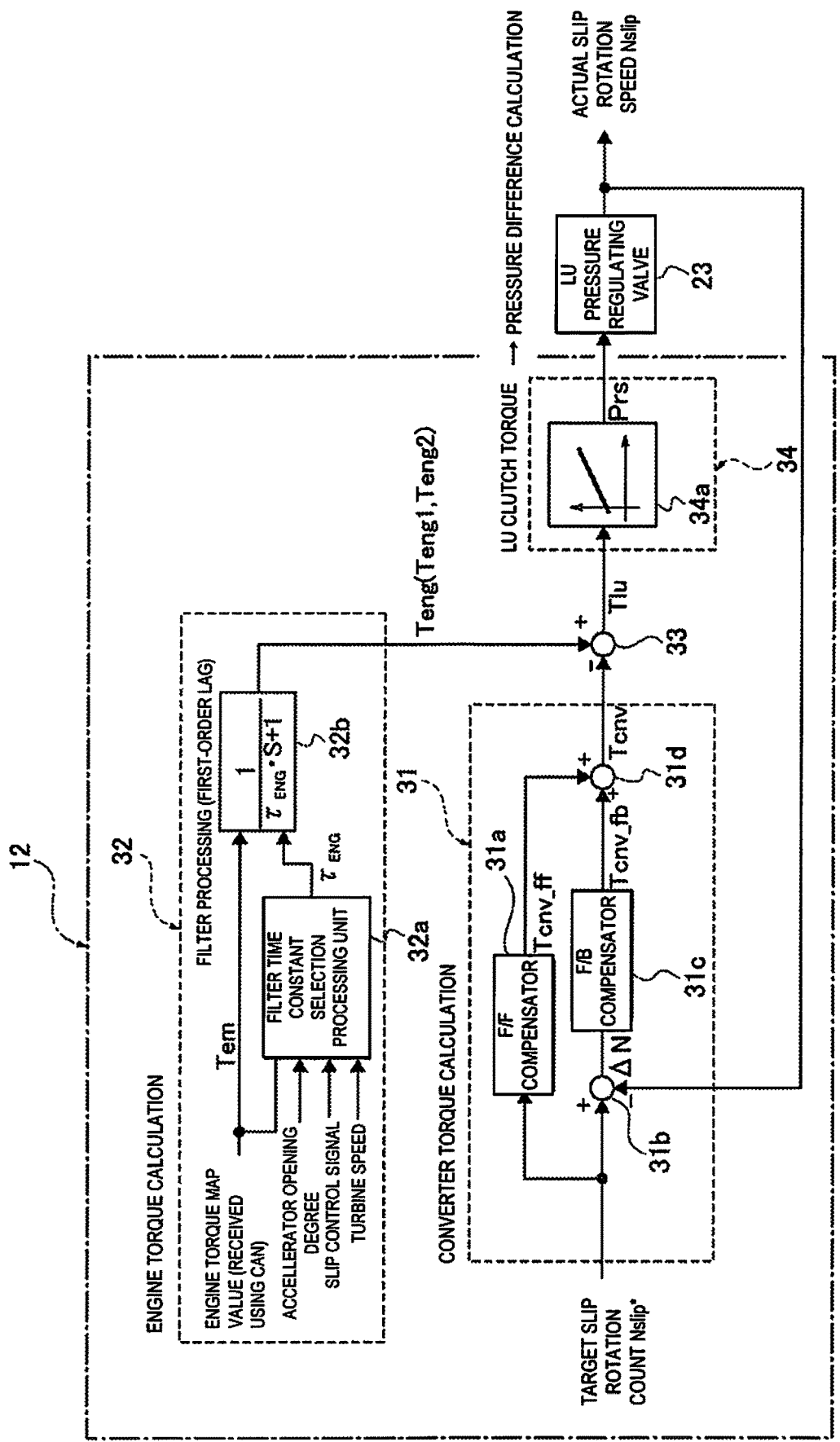
FIG. 4 is a control block diagram showing a slip lock-up control configuration having an AT control unit of embodiment 1.

FIG. 4 is a control block diagram showing the slip lock-up control configuration having the AT control unit 12 of embodiment 1. Hereafter, the slip lock-up control configuration is explained based on FIG. 4.

As shown in FIG. 4, the slip lock-up control configuration is provided with a converter torque calculation block 31, an engine torque calculation block 32, a differentiator 33, and an LU pressure difference calculation block 34. Also, there is an LU pressure regulation valve 23 that undergoes drive control by the LU pressure difference command LU (Prs) from the LU pressure difference calculation block 34, and creates the pressure difference Prs for slip engagement/complete engagement of the lock-up clutch 3.

The converter torque calculation block 31 is a block for calculating a converter torque Tcnv that is transmitted via the torque converter 4, and has an F/F compensator 31a, a subtracter 31b, an F/B compensator 31c, and an adder 31d. "F/F" is an abbreviation of "feed forward," and "F/B" is an abbreviation of "feed back."

The F/F compensator 31a inputs a target slip rotational speed Nslip*, calculates a converter torque F/F compensation amount Tcnv_ff according to the target slip rotational speed Nslip*, and outputs that to the adder 31d. The subtracter 31b finds the slip rotational speed deviation ΔN for which the actual slip rotational speed Nslip is subtracted from the target slip rotational speed Nslip*, and this is outputted to the F/B compensator 31c. The F/B compensator 31c inputs the slip rotational speed deviation ΔN, calculates the converter torque F/B compensation amount Tcnv_fb according to the slip rotational speed deviation ΔN, and outputs this to the adder 31d. The adder 31d adds the converter torque F/F compensation amount Tcnv_ff and the converter torque F/B compensation amount Tcnv_fb to find the converter torque Tcnv, and outputs this to the differentiator 33.

Here, the "target slip rotational speed Nslip*" is given by the target slip rotational speed characteristics that reduce the slip rotational speed of the lock-up clutch 3 gradually together with the passing of time facing the LU engaging timing when the slip LU control is started. The "actual slip rotational speed Nslip" is the actual differential rotational speed of the lock-up clutch 3, and when the slip LU control is started, this is found as necessary by the process of subtracting the turbine speed Nt from the engine speed Ne. The engine speed Ne is acquired using the sensor signal from the engine speed sensor 14, and the turbine speed Nt is acquired using the sensor signal from the turbine speed sensor 15.

The engine torque calculation block 32 is a block for calculating the engine torque which is the input torque to the torque converter 4, and has a filter time constant selection processing unit 32a and an engine filter processing unit 32b.

Figure 5:
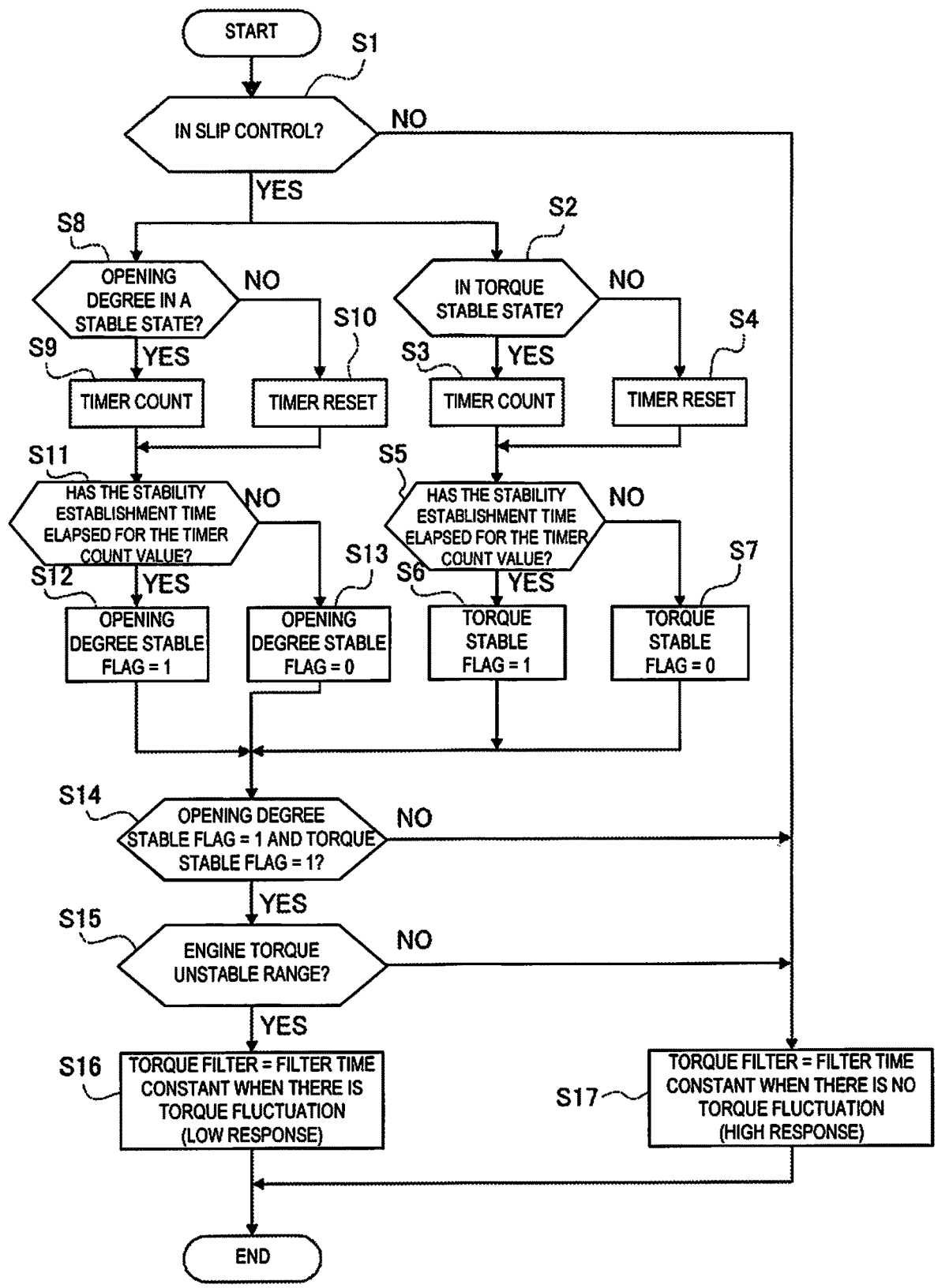
FIG. 5 is a flow chart showing the flow of a selection process of a filter time constant executed using a filter time constant selection processing unit having an engine torque calculation block of the slip lock-up control configuration of FIG. 4.

The filter time constant selection processing unit 32a inputs the necessary information such as the engine torque map value Tem, the accelerator opening degree APO, the slip control signal, the turbine speed Nt, etc., and selects the filter time constant $\tau_{ENG}$ according to the filter time constant selection process shown in FIG. 5. As the filter time constant $\tau_{ENG}$, a high response first filter time constant $\tau_{ENG}1$, or a low response second filter time constant $\tau_{ENG}2$ is selected, and the filter time constant $\tau_{ENG}$ selected at that time is outputted to the engine filter processing unit 32b.

Here, the "filter time constant $\tau_{ENG}$" means the index showing the response speed of the transient phenomenon that changes when the engine torque map value Tem is changed to the actual engine torque by a first-order lag exponential characteristic. In other words, with respect to the engine torque map value Tem obtained by searching the engine dynamics map, the actual engine torque is in a relationship that changes with the first-order lag exponential characteristic. When the value of the "filter time constant $\tau_{ENG}$" is a small value, responsiveness (readiness) is high, and when it is a large value, responsiveness is low.

The engine filter processing unit 32b has a first-order lag filter that is expressed by a transfer function $\{1/(\tau_{ENG} s+1)\}$, and acquires the engine torque filter value Teng by passing the engine torque map value Tem through the first-order lag filter. As the engine torque filter value Teng, this is a first engine torque filter value Teng1 when the first filter time constant $\tau_{ENG}1$ is selected, and is a second engine torque filter value Teng2 when the second filter time constant $\tau_{ENG}2$ is selected. Also, the engine torque filter value Teng acquired by the engine filter processing unit 32b is outputted to the differentiator 33.

The differentiator 33 calculates the LU clutch torque Tlu by subtracting the converter torque Tcnv that is from the converter torque calculation block 31 from the engine torque filter value Teng that is from the engine torque calculation block 32, and outputs that to the LU pressure difference calculation block 34.

Here, explained is the reason that the "LU clutch torque Tlu" is calculated by subtracting the converter torque Tcnv from the engine torque filter value Teng.

First, with the input torque to the torque converter 4, by being shared with the coupling transmission torque via the fluid coupling, and the clutch transmission torque via the lock-up clutch 3, these are respectively in the relationship shown in formula (a) hereafter.

Input torque=Coupling transmission torque+Clutch transmission torque (a)

Also, when this formula (a) is rewritten, it becomes formula (b) noted hereafter.

Engine torque filter value Teng=Converter torque Tcnv+LU clutch torque Tlu (b)

Furthermore, when the left side of formula (b) is made to be LU clutch torque Tlu, this results in the formula (c) noted hereafter.

LU clutch torque Tlu=Engine torque filter value Teng Converter torque Tcn (c)

The LU pressure difference calculation block 34 has a conversion map 34a for the LU clutch torque Tlu and the pressure difference Prs, and when the LU clutch torque Tlu is input from the differentiator 33, the pressure difference Prs according to the LU clutch torque Tlu is calculated using a map search. Also, the LU pressure difference command LU (Prs) for obtaining the pressure difference Prs that matches the actual slip rotational speed Nslip to the target slip rotational speed Nslip* is outputted to the LU pressure regulation valve 23. Here, the LU pressure difference command LU (Prs) in the case of the first engine torque filter value Teng1 by selection of the high response first filter time constant $\tau_{ENG}1$ is used as the first LU pressure difference command LU (Prs1). On the other hand, the LU pressure difference command LU (Prs) in the case of the second engine torque filter value Teng2 by selection of the low response second filter time constant $\tau_{ENG}2$ is used as the second LU pressure difference command LU (Prs2). At this time, the second LU pressure difference command LU (Prs2) becomes the pressure difference command for which the pressure difference fluctuation is averaged more than the first LU pressure difference command LU (Prs1).

[Filter Time Constant Selection Process Configuration]

FIG. 5 shows the flow of the selection process of the filter time constant $\tau_{ENG}$ executed by the filter time constant selection processing unit 32a possessed by the engine torque calculation block 32 of the slip lock-up control configuration of FIG. 4. Hereafter, explained is each step of FIG. 5 showing the filter time constant selection process configuration. This process is started when an LU engaging request is outputted when the lock-up clutch 3 is in a released state.

At step S1, a judgment is made of whether or not currently in slip LU control for which the slip control signal is input. When YES (is in slip LU control), the process advances to step S2 and step S8, and when NO (other than in slip LU control), the process advances to step S17.

Here, "in slip LU control" means the period from the time when the lock-up clutch 3 piston stroke ends and the LU capacity starts to appear until the lock-up clutch 3 is completely engaged. Step S2 to step S7 are the process steps for whether the engine torque is in a stable state, and step S8 to step S13 are the process steps for whether the accelerator opening degree is in a stable state, and the two processes are executed in parallel.

At step S2, following the judgment at step S1 of being in slip LU control, a judgment is made of whether the engine torque is in a stable state. When YES (engine torque stable state), the process advances to step S3, and when NO (engine torque unstable state), the process advances to step S4. Here, for the judgment of the torque stable state, when the change amount of the engine torque Te is a designated value or less, this is judged to be the engine torque stable state.

At step S3, following the judgment that the engine torque is in a stable state at step S2, the timer count value is added, and the process advances to step S5.

At step S4, following the judgment that the engine torque is in an unstable state at step S2, the timer count value is reset, and the process advances to step S5.

At step S5, following the timer count at step S3 or the timer reset at step S4, a judgment is made of whether or not the timer count value at that time has passed through the stability establishment time. When YES (timer count value≥stability establishment time), the process advances to step S6, and when NO (timer count value<stability establishment time), the process advances to step S7. Here, the "stability establishment time" is set to the duration time necessary to establish that the torque is in a stable state (steady state) when the judgment at step S2 that the torque is in a stable state continues.

At step S6, following the judgment at step S5 that the timer count value≥the stability establishment time, the torque stable flag is rewritten to torque stable flag=1, and the process advances to step S14.

At step S7, following the judgment at step S5 that the timer count value<the stability establishment time, the torque stable flag is left as is at torque stable flag=0, and the process advances to step S14.

At step S8, following the judgment at step S1 of being in slip LU control, a judgment is made of whether or not the accelerator opening degree is in a stable state. When YES (the accelerator opening degree is in a stable state), the process advances to step S9, and when NO (the accelerator opening degree is in an unstable state), the process advances to step S10. Here, the judgment of the opening degree stable state is judged to be an accelerator opening degree stable state when the change amount of the accelerator opening degree APO is a designated value or less.

At step S9, following the judgment at step S8 that the accelerator opening degree is in a stable state, the timer count value is added, and the process advances to step S11.

At step S10, following the judgment at step S8 that the accelerator opening degree is in an unstable state, the timer count value is reset, and the process advances to step S11.

At step S11, following the timer count at step S9 or the timer reset at step S10, a judgment is made of whether or not the timer count value at that time has passed through the stability establishment time. When YES (the timer count value≥the stability establishment time), the process advances to step S12, and when NO (the timer count value<the stability establishment time), the process advances to step S13. Here, the "stability establishment time" is set to the duration time required for an opening degree stable state (=steady state) to be established when the judgment at step S8 that the opening degree is in a stable state continues.

At step S12, following the judgment at step S11 that the timer count value≥the stability establishment time, the opening degree stable flag is rewritten to opening degree stable flag=1, and the process advances to step S14.

At step S13, following the judgment at step S11 that the timer count value<the stability establishment time, the opening degree stable flag is left as is at opening degree stable flag=0, and the process advances to step S14.

At step S14, following step S6, step S7, step S12, and step S13, a judgment is made of whether or not the opening degree stable flag=1, and the torque stable flag=1. When YES (both of the two stable flags are 1), the process advances to step S15, and when NO (at least one of the stable flags is 0), the process advances to step S17.

At step S15, following the judgment at step S14 that two stable flags are both 1, a judgment is made of whether or not the engine torque is in the unstable range. When YES (the engine torque is in the unstable range), the process advances to step S16, and when NO (other than the engine torque unstable range), the process advances to step S17.

Figure 6:
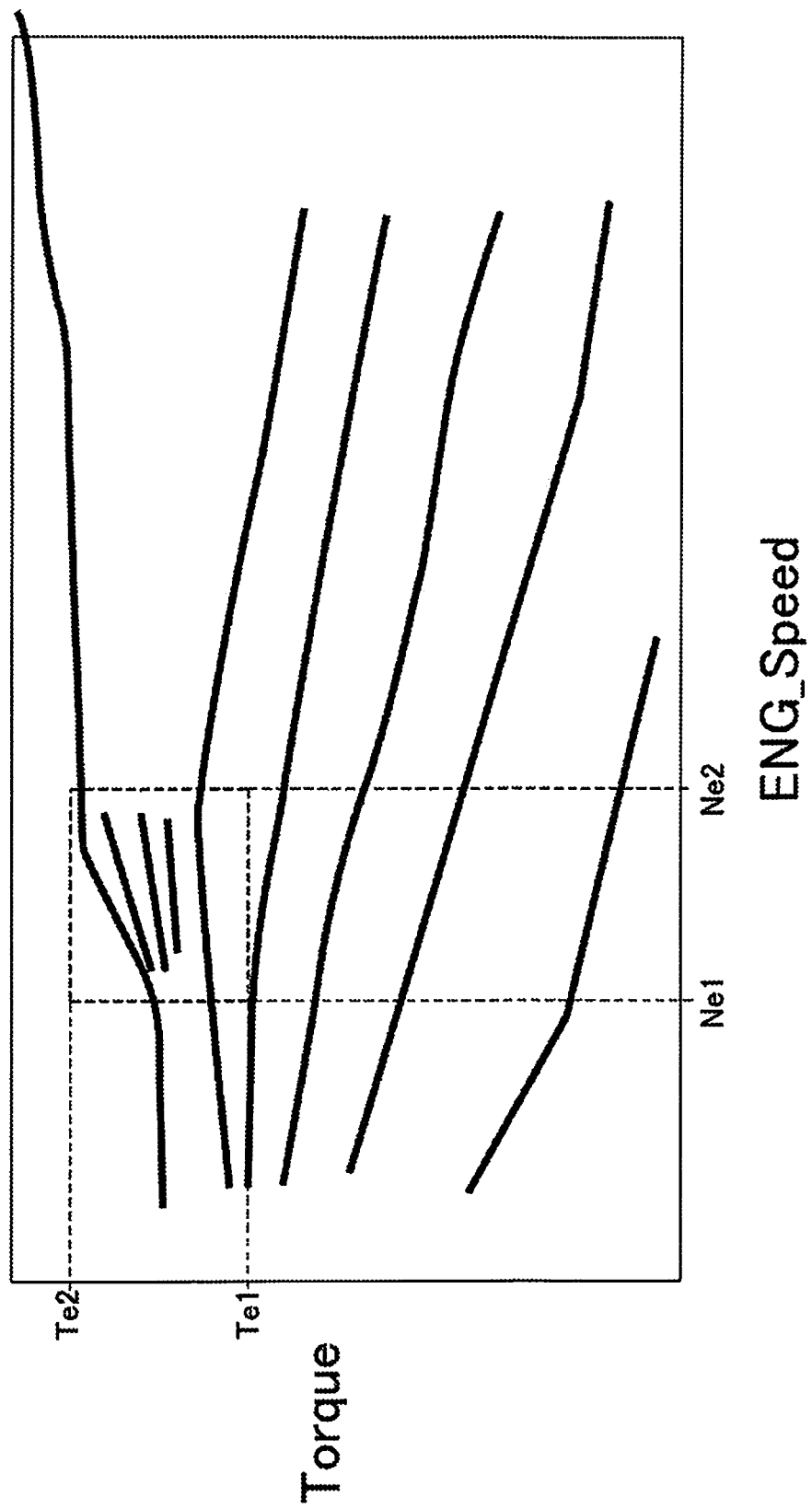
FIG. 6 is an engine dynamics drawing showing an engine torque unstable range for which the engine torque is not stable in the relation characteristics of engine speed and engine torque.

Here, as shown in FIG. 6, the "engine torque unstable range" is a range for which the engine speed (ENG_Speed) is in a low rotational speed, and the engine torque (Torque) is in a high torque range of a designated torque or greater. The engine speed low rotational speed range means a range from a first engine speed Ne1 (e.g. 1200 rpm) to a second engine speed Ne2 (e.g. 1700 rpm). The high torque range for which the engine torque is a designated torque or greater means a range of a first engine torque Te1 (e.g. 350 Nm) or greater, and up to a second engine torque Te2 (maximum torque). In other words, the "engine torque unstable range" means a range for which, as engine characteristics, the rotational speed and torque fluctuate with high sensitivity such that the engine torque has a rise gradient with respect to a rise change of the engine speed in the low rotation range.

At step S16, following the judgment at step S15 that the engine torque is in the unstable range, as the torque filter, the second filter time constant $\tau_{ENG}2$ (low response) during torque fluctuation is selected, and the process advances to the end.

Here, the second filter time constant $\tau_{ENG}2$ is set to a low response value for which the engine torque fluctuation is averaged, made to have flat torque characteristics, for example, a value 6 times greater than the first filter time constant $\tau_{ENG}1$.

At step S17, following the judgment at step S1 that this is other than in slip LU control, or the judgment at step S14 that at least one of the stable flags is 0, or the judgment at step S15 of being other than the engine torque in the unstable range, as the torque filter, the first filter time constant $\tau_{ENG}1$ (high response) during non-torque fluctuation is selected, and the process advances to the end. The first filter time constant $\tau_{ENG}1$ is set to a high response value based on the engine dynamics.

Next, the operation is explained.

The operation for embodiment 1 is explained divided into, "Exhaust Noise Fluctuation Generation Mechanism and Countermeasures," "Filter Time Constant Selection Process Operation," "Slip Lock-up Control Operation," and "Characteristic Operation with Slip Lock-up Control."

[Exhaust Noise Fluctuation Generation Mechanism and Countermeasures]

When slip lock-up control is performed using an engine torque filter value that has passed through a first-order lag filter having a filter time constant according to the engine dynamics, in the engine torque unstable range, the engine torque and the engine speed waver. Also, a problem that should be addressed was discovered, being that exhaust noise fluctuation is generated that gives discomfort to the driver due to the wavering fluctuation of the engine speed.

In light of that, upon detailed investigation of the generation mechanism of engine torque and engine speed wavering:

(1) The engine torque increases.

(2) By the engine torque filter value increasing, the LU pressure difference command also increases.

(3) Following after (2), the LU actual pressure difference also increases with a 100 msec delay.

(4) Due to the phase lag of the LU actual pressure difference with respect to the torque, during torque increase, the LU actual pressure difference decreases and slipping increases, and during torque decrease, the LU actual pressure difference increases and slipping decreases.

In this way, by advancing from (1) to (2) to (3) to (4), during the time until the engine torque becomes stable, slip fluctuation (swaying) occurs, and it became clear that the engine torque and the engine speed waver with vibration frequency of 2 Hz to 3 Hz.

In contrast, for handling using the engine side torque control focused on in (1) above, it is necessary to comply with the legal requirements for fuel consumption and exhaust, and stabilization of torque fluctuation greater than this is difficult. Because of that, from the perspective of not amplifying slip hunting due to LU actual pressure response lag with respect to the engine torque, there has been demand for handling on the slip lock-up control side focused on in (2) to (4). However, if it is only fluctuation of the engine speed, it is possible to suppress discomfort by "averaging" fluctuation of the meter (tachmeter), but it is not possible to reduce the discomfort due to fluctuation of the exhaust noise.

Figure 7:
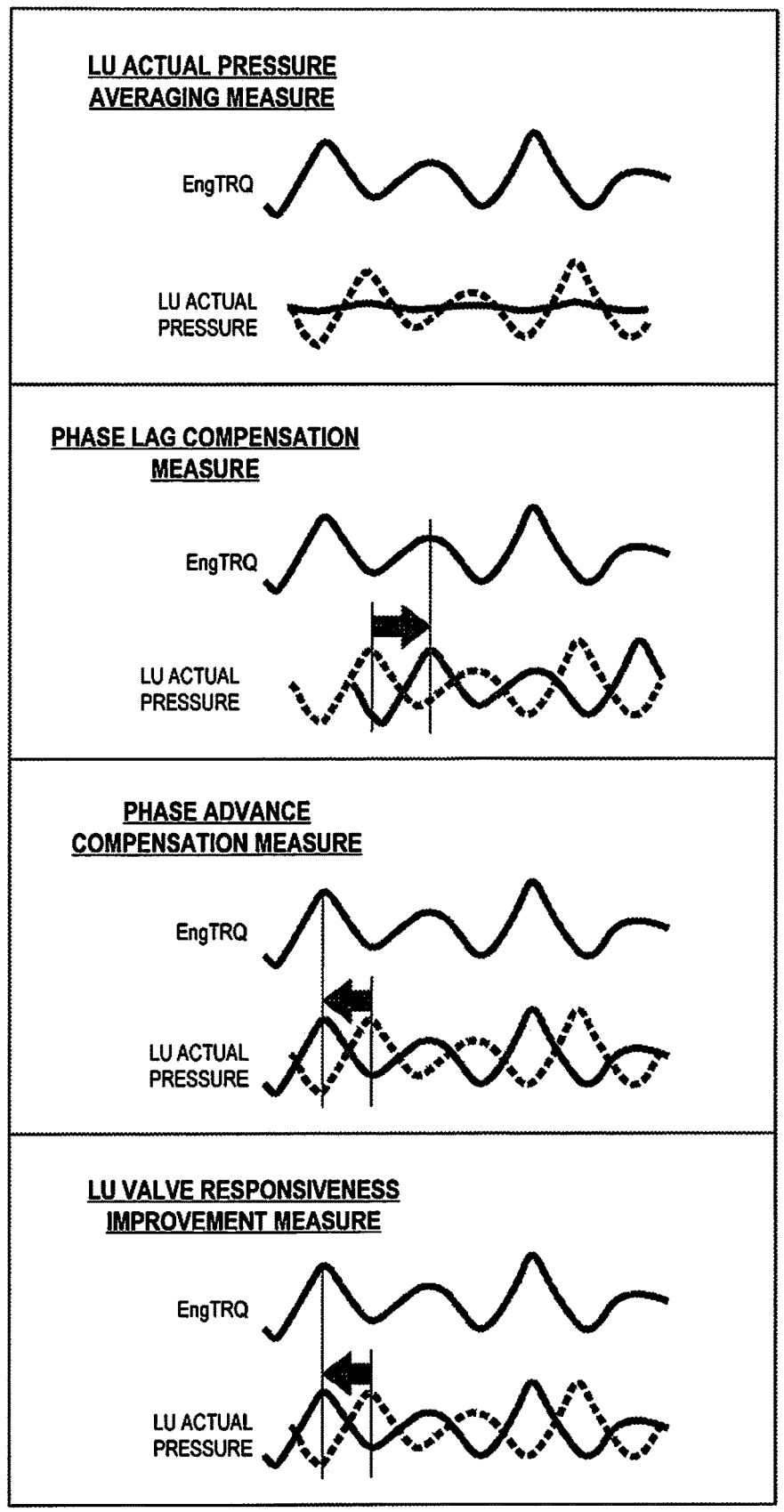
FIG. 7 is a comparison characteristics diagram showing engine torque characteristics and LU hydraulic characteristics for, as measures shown by example for handling fluctuation in exhaust noise on the slip lock-up control side: LU actual pressure averaging measures, phase lag compensation measures, phase advance compensation measures, and LU valve responsiveness improvement measures.

In light of that, in accordance with the demand for handling on the slip lock-up control side, as shown in FIG. 7, specific measures for handling fluctuation of the exhaust noise include "LU actual pressure averaging measure," "Phase lag compensation measure," "Phase advance compensation measure," and "LU valve responsiveness improvement measure," and verification was done for each of the respective measures.

Regarding the "LU actual pressure averaging measure," by having an LU actual pressure averaged state (state not susceptible to change) without being made to follow the engine torque, the change of (2) noted above is suppressed, and the movement of (3) to (4) thereafter is also suppressed, so it is possible to suppress the fluctuation of the engine speed itself.

Regarding the "Phase lag compensation measure," when the lag compensation for the responsiveness of the LU actual pressure is skewed, there is a risk of making the level of hunting worse than the current level.

Regarding the "Phase advance compensation measure," when the advance compensation responsiveness is skewed from the LU actual pressure characteristics, there is a risk of making the level of hunting worse than the current level.

Regarding the "LU valve responsiveness improvement measure," since performance improves, there is little risk, but in addition to requiring a change in hardware, the entire area is affected during travelling.

As a result of performing a comparison investigation, with the invention of this application, as a measure for addressing the problem of exhaust noise suppression in the engine torque unstable range (=low-speed high-torque range), the "LU actual pressure averaging measure" which was evaluated most highly among the four measures was selected, and this was adapted.

[Filter Time Constant Selection Process Operation]

The filter time constant selection process operation executed with embodiment 1 in accordance with adapting the abovementioned "LU actual pressure averaging measure" is explained based on the flow chart shown in FIG. 5.

When the being in slip LU control condition and the opening degree and torque stable condition are fulfilled, but the engine torque unstable range condition is not fulfilled, in the flow chart in FIG. 5, the process advances from step S1 to (step S2 to step S13) to step S14 to step S15 to step S17 to the end. At step S17, as the torque filter, the first filter time constant $\tau_{ENG}1$ (high response) during non-torque fluctuation is selected.

When the being in slip LU control condition, the opening degree and torque stable state condition, and the engine torque unstable range condition are all fulfilled, in the flow chart in FIG. 5, the process advances from step S1 to (step S2 to step S13) to step S14 to step S15 to step S16 to the end. In other words, at step S16, as the torque filter, there is a switch from the selection of the first filter time constant $\tau_{ENG}1$ (high response) to selection of the second filter time constant $\tau_{ENG}2$ (low response) during torque fluctuation.

Also, when the second filter time constant $\tau_{ENG}2$ is selected, when other than in slip LU control, in the flow chart in FIG. 5, the process advances from step S1 to step S17 to the end. At step S17, there is a switch from the selection of the second filter time constant $\tau_{ENG}2$ (low response) to selection of the first filter time constant $\tau_{ENG}1$ (high response) during non-torque fluctuation.

When the second filter time constant $\tau_{ENG}2$ is selected, when the engine 1 operation range is other than the engine torque unstable range, in the flow chart in FIG. 5, the process advances from step S1 to (step S2 to step S13) to step S14 to step S15 to step S17 to the end. At step S17, there is a switch from the selection of the second filter time constant $\tau_{ENG}2$ to selection of the first filter time constant $\tau_{ENG}1$ during non-torque fluctuation.

When the second filter time constant $\tau_{ENG}2$ is selected, when at least one of the accelerator opening degree APO and the engine torque Te is other than a stable state, in the flow chart in FIG. 5, the process advances from step S1 to (step S2 to step S13) to step S14 to step S17 to the end. At step S17, there is a switch from the selection of the second filter time constant $\tau_{ENG}2$ (low response) to selection of the first filter time constant $\tau_{ENG}1$ (high response) during non-torque fluctuation.

In this way, the condition for switching from selection of the first filter time constant $\tau_{ENG}1$ to selection of the second filter time constant $\tau_{ENG}2$ is when all of the being in slip LU control condition, the opening degree and torque stable state condition, and the engine torque unstable range condition are fulfilled. In other words, the condition for switching from selection of the first filter time constant $\tau_{ENG}1$ to selection of the second filter time constant $\tau_{ENG}2$ includes the opening degree and torque stable state condition which is a duration time condition.

In contrast to this, the condition for switching from selection of the second filter time constant $\tau_{ENG}2$ to selection of the first filter time constant $\tau_{ENG}1$ is that switching is done immediately when any one condition is unfulfilled among the being in the slip LU condition, the opening degree and torque stable state condition, and the engine torque unstable range condition. In other words, a duration time condition is not included in the condition for switching from the second filter time constant $\tau_{ENG}2$ to the first filter time constant $\tau_{ENG}1$.

[Slip Lock-Up Control Operation]

First, the slip lock-up control operation with embodiment 1 is explained based on the control block shown in FIG. 4.

During slip lock-up control, with the F/F compensator 31a of the converter torque calculation block 31, the converter torque F/F compensation amount Tcnv_ff according to the inputted target slip rotational speed Nslip* is calculated, and outputted to the adder 31d. With the F/B compensator 31c of the converter torque calculation block 31, the converter torque F/B compensation amount Tcnv_fb according to the inputted slip rotational speed deviation ΔN from the subtracter 31b is calculated, and outputted to the adder 31d. Thus, by the converter torque F/F compensation amount Tcnv_ff and the converter torque F/B compensation amount Tcnv_fb being added by the adder 31d, the converter torque Tcnv is found, and the converter torque Tcnv is outputted to the differentiator 33.

During slip lock-up control, at the filter time constant selection processing unit 32a of the engine torque calculation block 32, based on the necessary information such as the inputted engine torque map value Tem, the accelerator opening degree APO, the slip control signal, the turbine speed Nt, etc., the filter time constant $\tau_{ENG}$ is selected according to the abovementioned filter time constant selection process operation. With the engine filter processing unit 32b of the engine torque calculation block 32, by the engine torque map value Tem being passed through the first-order lag filter $\{1/(\tau_{ENG} \cdot s+1)\}$, the engine torque filter value Teng is acquired. In other words, when the first filter time constant $\tau_{ENG}1$ is selected by the filter time constant selection processing unit 32a, the first engine torque filter value Teng1 is acquired. Also, when the second filter time constant $\tau_{ENG}1$ is selected by the filter time constant selection processing unit 32a, the second engine torque filter value Teng2 is acquired. Also, the engine torque filter value Teng acquired by the engine filter processing unit 32b is outputted to the differentiator 33.

Thus, with the differentiator 33, by subtracting the converter torque Tcnv that is from the converter torque calculation block 31 from the engine torque filter value Teng that is from the engine torque calculation block 32, the LU clutch torque Tlu is calculated. The calculated LU clutch torque Tlu is outputted to the LU pressure difference calculation block 34. With the next LU pressure difference calculation block 34, when the LU clutch torque Tlu from the differentiator 33 is inputted, using the conversion map 34a, the pressure difference Prs according to the LU clutch torque Tlu is calculated. Also, the LU pressure difference command LU (Prs) that obtains the pressure difference Prs for matching the actual slip rotational speed Nslip to the target slip rotational speed Nslip* is outputted to the LU pressure regulation valve 23.

In this way, when the LU engagement condition when the lock-up clutch 3 is in a released state is fulfilled, using the engine torque filter value Teng (Teng1 or Teng2), slip lock-up control is performed by the LU pressure difference command LU (Prs) that matches the actual slip rotational speed Nslip to the target slip rotational speed Nslip*. During this slip lock-up control, when in the engine torque unstable range, used is the second engine torque filter value Teng2 for which the torque fluctuation is averaged more than the first engine torque filter value Teng1 used in ranges other than the engine torque unstable range.

Figure 8:
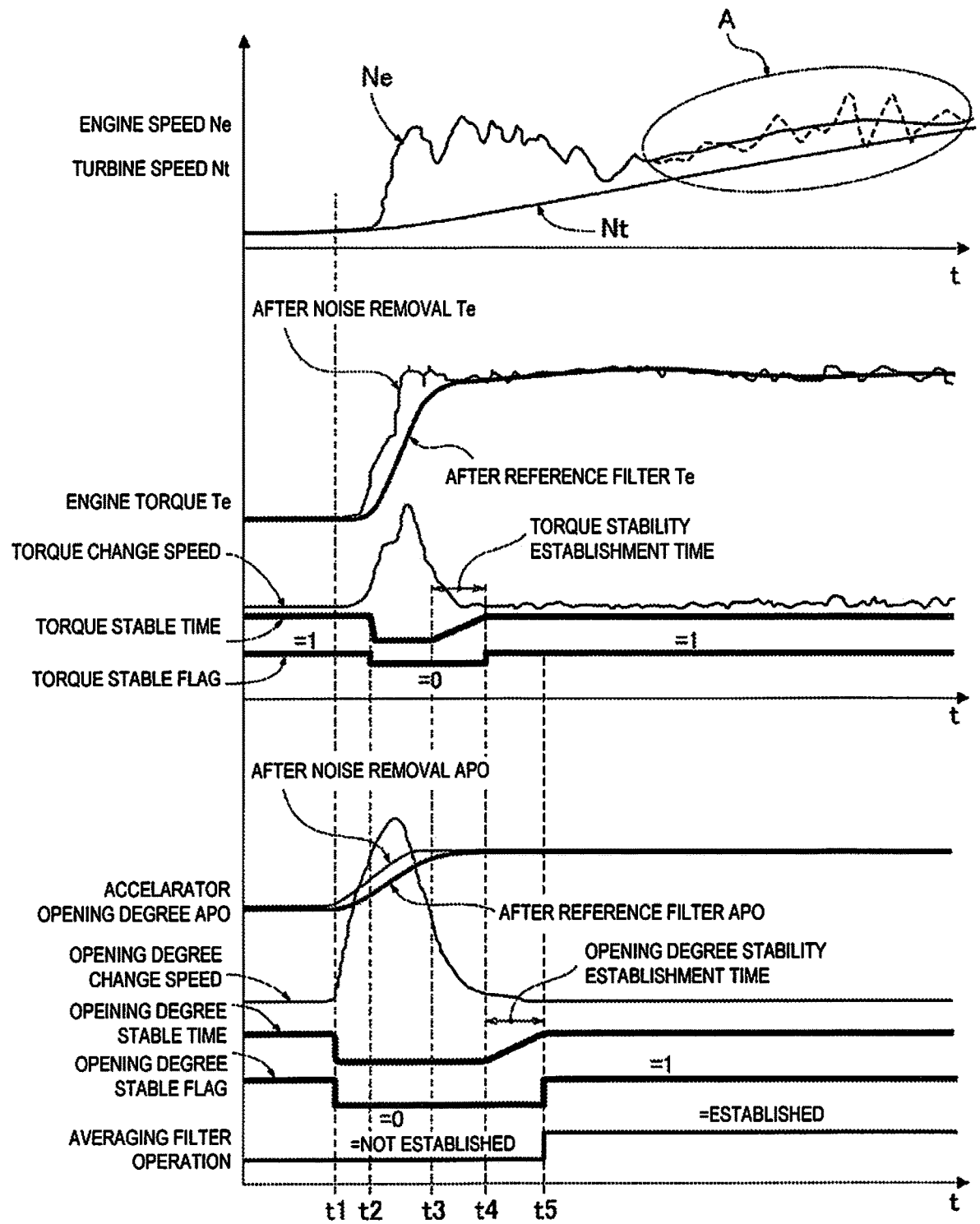
FIG. 8 is, in the travel time in which slip lock-up control of embodiment 1 is executed in the engine torque unstable range (low-speed high-torque range), a time chart showing each characteristic of: engine speed Ne, turbine speed Nt, engine torque Te, torque change speed, torque stable time, torque stable flag, accelerator opening degree APO, opening degree change speed, opening degree stable time, opening degree stable flag, and averaging filter operation.

Next, the slip lock-up control operation with embodiment 1 during traveling in the engine torque unstable range (=low-speed high-torque range) is explained based on the time chart shown in FIG. 8. Here, with the time chart of FIG. 8, up to time t1, the lock-up clutch 3 is in an engaged state using coast lock-up control, but by the accelerator pressing operation at time t1, the lock-up clutch 3 has LU released temporarily. Shown is a case when, after the temporary LU release, after going through slip lock-up control, the lock-up clutch 3 is re-engaged.

At time t1 at which the first filter time constant $\tau_{ENG}1$ is selected, when the accelerator pedal pressing operation is performed, the lock-up clutch 3 has LU released temporarily, and after that, slip lock-up control is started. At this time t1, by having a big change in the accelerator opening degree APO, the opening degree stable flag shifts from "Opening degree stable flag=1" to "Opening degree stable flag=0."

When time t2 is reached, delayed from the accelerator pedal pressing operation time t1, the engine torque Te after the reference filter (=engine torque filter value according to first filter time constant $\tau_{ENG}1$) starts to rise, and the torque change speed also starts to rise. Because of this, the torque stable flag shifts from "Torque stable flag=1" to "Torque stable flag=0." Also, when time t3 is reached, changes of the engine torque Te after the reference filter converge, and the torque change speed is almost zero. Because of this, when the torque stability establishment time from time t3 to time t4 has elapsed, the torque stable flag is shifted from "Torque stable flag=0" to "Torque stable flag=1."

When time t4 is reached, delayed from the accelerator pedal pressing operation time t1, the changes in the accelerator opening degree APO after the reference filter are converged, and the opening degree change speed is almost a constant speed. Because of this, when the opening degree stability establishment time from time t4 to time t5 has elapsed, the opening degree stable flag shifts from "Opening degree stable flag=0" to "Opening degree stable flag=1." In other words, when time t5 is reached, the averaging filter operation shifts from unfulfilled to fulfilled. Because of this, at time t5, there is a switching from the first filter time constant $\tau_{ENG}1$ to the second filter time constant $\tau_{ENG}2$.

Thus, from time t5 and thereafter, slip lock-up control is performed using the second engine torque filter value Teng2 for which the torque fluctuation was averaged by the second filter time constant $\tau_{ENG}2$. Because of this, the engine speed Ne from time t5 and thereafter, as shown by the solid line characteristics in the frame by arrow A in FIG. 8, characteristics for which rotational speed fluctuation is suppressed are shown. Incidentally, the dotted line characteristics in the frame according to arrow A in FIG. 8 are the engine speed characteristics when slip lock-up control was performed using the first engine torque filter value Teng1 with the torque fluctuation left as is. When the engine speed Ne exhibits the dotted line characteristics, we can see that exhaust noise fluctuation is generated by the engine speed Ne fluctuating.

[Characteristic Operation with Slip Lock-Up Control]

With embodiment 1, during slip lock-up control, when in the engine torque unstable range, the LU pressure difference command LU (Prs) is the second LU pressure difference command LU (Prs) for which the pressure difference fluctuation is averaged more than the first LU pressure difference command LU (Prs) when in a range other than that.

In other words, when in the engine torque unstable range, when the pressure difference fluctuation of the LU pressure difference command LU (Prs) that controls the engaging capacity of the lock-up clutch 3 is averaged, by the load fluctuation received from the lock-up clutch 3 by the engine 1 being suppressed, the wavering fluctuation of the engine speed Ne is reduced.

Therefore, during slip lock-up control, when in the engine torque unstable range, exhaust noise fluctuation that causes discomfort to the driver is suppressed.

With embodiment 1, during slip lock-up control, when in the engine torque unstable range, used is the second engine torque filter value Teng2 for which the torque fluctuation is averaged more than with the first engine torque filter value Teng1 that is used when in a range other than the engine torque unstable range.

Specifically, focusing on the point of exhaust noise fluctuation that gives discomfort to drivers being generated when in the engine torque unstable range, torque fluctuation of the engine torque filter value Teng used as the engine torque information in slip lock-up control was made to be suppressed. In other words, in the engine torque unstable range, in regards to the change amount of the converter torque Tcnv that influences the slip lock-up controllability of matching the actual slip rotational speed Nslip to the target slip rotational speed Nslip*, there is a reflection in the LU pressure difference command LU (Prs).

Therefore, when in the engine torque unstable range, the exhaust noise fluctuation that gives discomfort to the driver is suppressed while ensuring the slip lock-up controllability.

With embodiment 1, during slip lock-up control, when determined to be in the engine torque unstable range and in a steady state, there is a switch from the first engine torque value Teng1 to the second engine torque filter value Teng2.

Specifically, in the transient state when there is an accelerator operation or the engine torque changes, because there is a status of fluctuation of the exhaust noise, even if there is exhaust noise fluctuation, discomfort is not caused for the driver. On the other hand, when in a steady state such as when the amount of acceleration operation is kept constant or when there is no change in engine torque, when there is exhaust noise fluctuation that was not intended by the driver, discomfort is caused for the driver. Focusing on this point, priority is given to suppressing exhaust noise fluctuation limited to when in a steady state, and priority is given to slip lock-up control when in a transient state.

Therefore, when in the engine torque unstable range, slip lock-up controllability is ensured in the transient state, and exhaust noise fluctuation that causes discomfort for the driver is suppressed in the steady state.

With embodiment 1, when the change amount of the engine torque Te is a designated value or less, this is determined to be a steady state.

Specifically, when there is exhaust noise fluctuation in a state when the engine torque Te is kept in a constant state, discomfort is caused by there being exhaust noise fluctuation that was not intended by the driver.

Therefore, when the engine torque Te is kept constant, this is determined to be a steady state in which the exhaust noise fluctuation is suppressed.

With embodiment 1, when the change amount of the accelerator opening degree APO is a designated value or less, this is determined to be a steady state.

Specifically, when there is exhaust noise fluctuation in a state for which the accelerator operation amount is kept constant, discomfort is caused by there being exhaust noise fluctuation that was not intended by the driver.

Therefore, when the accelerator operation amount is kept constant, this is determined to be a steady state in which the exhaust noise fluctuation is suppressed.

With embodiment 1, there are the filter time constant selection processing unit 32a for selecting the engine torque filter time constant $\tau_{ENG}$, and the engine torque filter processing unit 32b for obtaining the engine torque filter value Teng by the engine torque map value Tem being passed through the first-order lag filter in which the selected filter time constant $\tau_{ENG}$ is used. Also, the filter time constant selection processing unit 32a performs the selection process of the first filter time constant $\tau_{ENG}1$ based on the engine dynamics that obtains the first engine torque filter value Teng1, and of the second filter time constant $\tau_{ENG}2$ with a lower response than the first filter time constant $\tau_{ENG}1$ that obtains the second engine torque filter value Teng2.

Specifically, for the engine torque information with the slip lock-up control, used is the engine torque filter value Teng for which the engine torque map value Tem is passed through the first-order lag filter having the filter time constant $\tau_{ENG}$ corresponding to the engine dynamics.

Therefore, by selecting the second filter time constant $\tau_{ENG}2$ with a lower response than the first filter time constant $\tau_{ENG}1$ based on the engine dynamics, while utilizing the first-order lag filter prepared in advance as is, the second engine torque filter value Teng2 for which torque fluctuation is averaged is obtained.

With embodiment 1, when a state in which all three conditions of the being in slip lock-up control condition, the engine torque unstable range condition, and the steady state condition are fulfilled has elapsed for a designated time, there is a switch from the first filter time constant $\tau_{ENG}1$ to the second filter time constant $\tau_{ENG}2$. On the other hand, when the second filter time constant $\tau_{ENG}2$ is selected, and at least one of the conditions among the three conditions is not fulfilled, there is an immediate switch to the first filter time constant $\tau_{ENG}1$.

Specifically, the switching from the first filter time constant $\tau_{ENG}1$ to the second filter time constant $\tau_{ENG}2$ is switching that reduces the slip lock-up controllability, so there is a demand for the reliability of being in a state for which all three of the conditions are reliably fulfilled. On the other hand, with the switching from the second filter time constant $\tau_{ENG}2$ to the first filter time constant $\tau_{ENG}1$, when there is a delay in the switch timing, there is the risk of excessive LU capacity, or increased clutch slipping, so quick switch timing is required.

Therefore, while the reliability requirement is met when switching the filter time constant $\tau_{ENG}$ to the low response second filter time constant $\tau_{ENG}2$, the quick switch timing requirement is met when switching to the high response first filter time constant $\tau_{ENG}1$.

Next, the effects are explained.

With the slip lock-up control device of the engine-drive vehicle of embodiment 1, the effects noted hereafter are obtained.

(1) A slip lock-up control device for a vehicle (engine-driven vehicle), comprising:

a torque converter 4 having a lock-up clutch 3, placed between an engine 1 and a transmission (stepped transmission 6), and a slip lock-up controller (AT control unit 12) that, when a lock-up engagement condition is fulfilled when the lock-up clutch 3 is in a released state, using engine torque information which is input torque, performs slip lock-up control using an LU pressure difference command LU (Prs) for matching the actual slip rotational speed Nslip to a target slip rotational speed Nslip*, wherein with the slip lock-up controller (At control unit 12, FIG. 4), during slip lock-up control, when in the engine torque unstable range for which the torque of the engine 1 is unstable, the LU pressure difference command LU (Prs) is set to a second LU pressure difference command LU (Prs2) for which the pressure difference fluctuation is averaged more than a first LU pressure difference command LU (Prs1) when in a range other than the engine torque unstable range.

Because of this, during slip lock-up control, when in the engine torque unstable range, it is possible to suppress fluctuation of exhaust noise which causes discomfort for the driver.

(2) The slip lock-up controller (AT control unit 12, FIG. 4) uses an engine torque filter value Teng obtained by passing an engine torque map value Tem through a first-order lag filter for the engine torque information, and during slip lock-up control, when in the engine torque unstable range, a second engine torque filter value Teng2 is used for which the torque fluctuation is averaged more than a first engine torque filter value Teng1 used in a range other than the engine torque unstable range.

Because of this, in addition to the effect of (1), when in the engine torque unstable range, it is possible to suppress fluctuation of exhaust noise which causes discomfort for the driver while ensuring slip lock-up controllability.

(3) The slip lock-up controller (AT control unit 12, FIG. 4), during slip lock-up control, if determined to be in the engine torque unstable range and a steady state, switches from the first LU pressure difference command LU (Prs1) to the second LU pressure difference command LU (Prs2) (FIG. 5, S1 to S3).

Because of this, in addition to the effect of (1) or (2), when in the engine torque unstable range, it is possible to suppress fluctuation of exhaust noise which causes discomfort for the driver in a steady state while ensuring slip lock-up controllability in a transient state.

(4) The slip lock-up controller (AT control unit 12, FIG. 4), when the change amount of the engine torque Te is a designated value or less, determines that this is a steady state (FIG. 5, S3).

Because of this, in addition to the effect of (3), when in slip lock-up control, when in the engine torque unstable range, when the engine torque Te is kept constant, it is possible to determine this to be a steady state in which fluctuation of exhaust noise is suppressed.

(5) The slip lock-up controller (AT control unit 12, FIG. 4), when the change amount of the accelerator opening degree APO is a designated value or less, determines that this is a steady state (FIG. 5, S3).

Because of this, in addition to the effect of (3) or (4), when in slip lock-up control, and in the engine torque unstable range, when the accelerator operation amount is kept constant, it is possible to determine this to be a steady state for which fluctuation of exhaust noise is suppressed.

(6) The slip lock-up controller (AT control unit 12, FIG. 4) has a filter time constant selection processing unit 32a for selecting an engine torque filter time constant $\tau_{ENG}$, and an engine torque filter processing unit 32b for obtaining an engine torque filter value Teng by passing an engine torque map value Tem through a first-order lag filter for which the selected filter time constant $\tau_{ENG}$ is used, and the filter time constant selection processing unit 32a performs a selection process of a first filter time constant $\tau_{ENG}1$ based on engine dynamics that obtains the first engine torque filter value Teng1, and a second filter time constant $\tau_{ENG}2$ with a lower response than the first filter time constant $\tau_{ENG}1$ that obtains the second engine torque filter value $\tau_{ENG}2$.

Because of this, in addition to the effects of (2) to (5), it is possible to obtain a second engine torque filter value Teng2 for which torque fluctuation is averaged while utilizing as is the first order lag filter prepared in advance in the engine torque filter processing unit 32b.

(7) The filter time constant selection processing unit 32a, when a designated time elapses in a state for which all three conditions of the being in slip lock-up control condition, the engine torque unstable range condition, and the steady state condition are fulfilled, switches from the first filter time constant $\tau_{ENG}1$ to the second filter time constant $\tau_{ENG}2$, and when the second filter time constant $\tau_{ENG}2$ is selected, when at least one of the conditions among the three conditions is not fulfilled, switches immediately to the first filter time constant $\tau_{ENG}1$ (FIG. 5).

Because of this, in addition to the effect of (6), while the reliability requirement is met when switching the filter time constant $\tau_{ENG}$ to the low response second filter time constant $\tau_{ENG}2$, the quick switch timing requirement is met when switching to the high response first filter time constant $\tau_{ENG}1$.

Above, the slip lock-up control device for a vehicle of the present invention was explained based on embodiment 1, but the specific configuration is not limited to this embodiment 1, and design modifications or additions, etc. are allowed as long as they do not stray from the gist of the invention of each claim in the patent claims.

With embodiment 1, as the slip lock-up controller or the slip lock-up control means, shown was an example of switching the filter time constant $\tau_{ENG}$ to the low response second filter time constant $\tau_{ENG}2$ when the LU pressure difference command LU (Prs) is set to be the second LU pressure difference command LU (Prs2) for which the pressure difference fluctuation is averaged more than with the first LU pressure difference command LU (Prs1). However, as the slip lock-up controller or the slip lock-up control means, it is also possible to have an example of passing through an averaging filter for the LU pressure difference command LU (Prs) itself. It is also possible to have an example of passing through an averaging filter for the LU clutch torque Tlu. Furthermore, it is also possible to have an example of passing through an averaging filter for the engine filter value Teng.

With embodiment 1, as the slip lock-up controller or the slip lock-up control means, during slip lock-up control, when a determination is made of being in the engine torque unstable range and in a steady state, an example is shown of switching from the first LU pressure difference command LU (Prs1) to the second LU pressure difference command LU (Prs2). However, as the slip lock-up controller or the slip lock-up control means, it is also possible to have an example for which, during slip lock-up control, if in the engine torque unstable range, regardless of whether in the steady state or the transient state, there is switching from the first LU pressure difference command LU (Prs1) to the second LU pressure difference command LU (Prs2).

With embodiment 1, shown is an example for which a determination is made that the accelerator opening degree APO and the engine torque Te are both in a stable state. However, as the determination of being in a steady state, it is also possible to have an example of determination such that at least one of the accelerator opening degree APO and the engine torque Te being in a stable state is determined as being in a steady state.

With embodiment 1, shown is an example of applying the slip lock-up control device of the present invention to an engine-driven vehicle in which are mounted a torque converter with a lock-up clutch and a stepped transmission. However, the slip lock-up control device of the present invention can also be applied to a hybrid vehicle in which are mounted an engine and motor for the drive source. Also, as the transmission, it is also possible to apply this to a vehicle in which is mounted a stepless transmission, or an automatic transmission of a stepless transmission with an auxiliary transmission. In other words, it is possible to apply this provided it is a vehicle for which the torque converter having the lock-up clutch is provided between the engine and the transmission.

The invention claimed is:

1. A slip lock-up control device for a vehicle, comprising:
    a torque converter placed between an engine and a transmission, the torque converter having a lock-up clutch; and
    a slip lock-up controller configured to perform slip lock-up control using a lock-up pressure difference command to match an actual slip rotational speed to a target slip rotational speed based on engine torque information indicative of input torque, when a lock-up engagement condition is fulfilled when the lock-up clutch is in a released state, wherein
    during the slip lock-up control, when in an engine torque unstable range for which an engine torque has a rise gradient with respect to a rise change of an engine speed, the slip lock-up controller is configured to set the lock-up pressure difference command to a second lock-up pressure difference command for which a pressure difference fluctuation is averaged more than a first lock-up pressure difference command used in a range other than the engine torque unstable range.

2. The slip lock-up control device for a vehicle according to claim 1, wherein
    the slip lock-up controller is configured to use an engine torque filter value obtained by passing an engine torque map value through a first-order lag filter for the engine torque information, and
    during the slip lock-up control, when in the engine torque unstable range, the slip lock-up controller is configured to use a second engine torque filter value for which a torque fluctuation is averaged more than a first engine torque filter value used in a range other than the engine torque unstable range.

3. The slip lock-up control device for a vehicle according to claim 2, wherein
    the slip lock-up controller has a filter time constant selection processing unit configured to select an engine torque filter time constant, and an engine torque filter processing unit configured to obtain the engine torque filter value by passing an engine torque map value through the first-order lag filter for which the engine torque filter time constant selected by the filter time constant selection processing unit is used, and
    the filter time constant selection processing unit is configured to perform a selection process of a first filter time constant based on engine dynamics that obtains the first engine torque filter value, and a second filter time constant with a lower response than the first filter time constant that obtains the second engine torque filter value.

4. The slip lock-up control device for a vehicle according to claim 3, wherein
    the filter time constant selection processing unit is configured to switch from the first filter time constant to the second filter time constant, when a prescribed time elapses in a state for which all three conditions including a slip lock-up control condition, an engine torque unstable range condition, and a steady state condition are fulfilled, and the filter time constant selection processing unit is configured to switch immediately to the first filter time constant when at least one of the the three conditions is not fulfilled while the second filter time constant is selected.

5. The slip lock-up control device for a vehicle according to claim 1, wherein, during slip lock-up control, when determined to be in the engine torque unstable range and in a steady state, the slip lock-up controller is configured to switch from the first lock-up pressure difference command to the second lock-up pressure difference command.

6. The slip lock-up control device for a vehicle according to claim 5, wherein
    the slip lock-up controller is configured to determine to be in the steady state when a change amount of the engine torque is a prescribed value or less.

7. The slip lock-up control device for a vehicle according to claim 5, wherein
    the slip lock-up controller is configured to determine to be in the steady state when a change amount of an accelerator opening degree is a prescribed value or less.

8. A slip lock-up control device for a vehicle, comprising:
    a torque converter placed between an engine and a transmission, the torque converter having a lock-up clutch; and
    slip lock-up control means for, when a lock-up engagement condition is fulfilled when the lock-up clutch is in a released state, using engine torque information which is input torque, performing slip lock-up control using a lock-up pressure difference command for matching an actual slip rotational speed to a target slip rotational speed, wherein
    during the slip lock-up control, when in an engine torque unstable range for which an engine torque has a rise gradient with respect to a rise change of an engine speed, the slip lock-up control means further has a function for setting the lock-up pressure difference command to a second lock-up pressure difference command for which a pressure difference fluctuation is averaged more than a first lock-up pressure difference command used in a range other than the engine torque unstable range.

* * * * *